No. 742,546.

PATENTED OCT. 27, 1903.

R. W. WOOD.
TIME LIMIT TICKET.
APPLICATION FILED JULY 10, 1902.

NO MODEL.

|  |  |  |  |
|---|---|---|---|
| Sun | 1 2 3 4 5 6 7 8 9 10 11 12 | Wed | 1 2 3 4 5 6 7 8 9 10 11 12 |
| Mon | 1 2 3 4 5 6 7 8 9 10 11 12 | Thur | 1 2 3 4 5 6 7 8 9 10 11 12 |
| Tues | 1 2 3 4 5 6 7 8 9 10 11 12 | Fri | 1 2 3 4 5 6 7 8 9 10 11 12 |
|  |  | Sat | 1 2 3 4 5 6 7 8 9 10 11 12 |

| First St | Second St | Third St | Fourth St | Fifth St | Sixth St | Seventh | Eighth St | Ninth St | Tenth St | Eleventh | Twelfth | Thirt'nth | Fourt'nth | Fifteenth | Sixteenth |
|---|---|---|---|---|---|---|---|---|---|---|---|---|---|---|---|
| a p | a p | a p | a p | a p | a p | a p | a p | a p | a p | a p | a p | a p | a p | a p | a p |
| 1 1 | 1 1 | 1 1 | 1 1 | 1 1 | 1 1 | 1 1 | 1 1 | 1 1 | 1 1 | 1 1 | 1 1 | 1 1 | 1 1 | 1 1 | 1 1 |
| 2 2 | 2 2 | 2 2 | 2 2 | 2 2 | 2 2 | 2 2 | 2 2 | 2 2 | 2 2 | 2 2 | 2 2 | 2 2 | 2 2 | 2 2 | 2 2 |
| 3 3 | 3 3 | 3 3 | 3 3 | 3 3 | 3 3 | 3 3 | 3 3 | 3 3 | 3 3 | 3 3 | 3 3 | 3 3 | 3 3 | 3 3 | 3 3 |
| 4 4 | 4 4 | 4 4 | 4 4 | 4 4 | 4 4 | 4 4 | 4 4 | 4 4 | 4 4 | 4 4 | 4 4 | 4 4 | 4 4 | 4 4 | 4 4 |
| 5 5 | 5 5 | 5 5 | 5 5 | 5 5 | 5 5 | 5 5 | 5 5 | 5 5 | 5 5 | 5 5 | 5 5 | 5 5 | 5 5 | 5 5 | 5 5 |

WITNESSES:
Alta White
Herbert Fairbank

INVENTOR.
Richard W. Wood
BY Frank E. Adams
ATTORNEY.

No. 742,546.

Patented October 27, 1903.

UNITED STATES PATENT OFFICE.

RICHARD WM. WOOD, OF SEATTLE, WASHINGTON.

TIME-LIMIT TICKET.

SPECIFICATION forming part of Letters Patent No. 742,546, dated October 27, 1903.

Application filed July 10, 1902. Serial No. 115,034. (No model.)

*To all whom it may concern:*

Be it known that I, RICHARD WM. WOOD, a citizen of the United States of America, and a resident of the city of Seattle, county of King, and State of Washington, have invented certain new and useful Improvements in Time-Limit Tickets, of which the following is a specification.

My invention relates to improvements in time-limit tickets, and has special reference to a ticket of this class especially useful as a transfer-ticket on street-railway lines or local trains.

Among numerous objects attained by this invention, and readily understood from the following specification and accompanying drawing included as a part thereof, is the production of a ticket of the above class embodying essential features of arrangement, simplicity, and adaptability, which greatly facilitates the action of issuing the ticket and reduces to a minimum the chances of making a mistake.

The above-mentioned and numerous other objects equally as desirable are attained by the combination, arrangement, and placement of characters as disclosed on the accompanying drawing, set forth in this specification, and succinctly pointed out in the appended claims.

The drawing filed herewith and included as a part of this specification discloses by a simple view the face of a ticket with characters indicated thereon as comprehended by my invention and arranged in their preferred embodiment.

My invention comprehends the use of characters indicating the name of days of a week as the base of operation, and as now considered the characters employed for this purpose are abbreviated names of the days themselves, as "Sun.," "Mon.," "Tues.," &c., which are the most familiar designations for this purpose, and these abbreviations are arranged on the ticket one over the other in a single or in a plurality of vertical columns. Associated with each of these day-of-the-week characters or names I have arranged a series of characters, as numbers, denoting certain hours of the day, as from "1" to "12," which are placed in consecutive order and in alinement with first said characters in a horizontal row, and similar characters in the several rows of hour designations are preferably disposed in vertical alinement when more than one day-of-the-week character is employed on a single ticket, as in the present instance.

Arranged along the lower margin of the ticket are a plurality of series of characters denoting periods of time into which the hours are divided, and each of these series as now considered consist of figures from "1" to "5," arranged in a vertical column and adapted to conveniently divide the hour into fractional parts each of ten minutes' duration. Associated with each of these series of hour-fraction characters is a character indicating a transfer-point—as, for example, the name of a street—which is printed on the ticket with the word or words comprising same extending vertically and parallel to the hour-fraction characters, so as to be associated therewith more closely. Suitable discernible dividing-lines are preferably placed between each series of the hour-fraction characters and the transfer-indicating characters associated with the adjoining series when a plurality of said series are employed, so as to clearly indicate which of each of said characters are relatively associated. In the present instance suitable characters, as the letters "A" and "P," are arranged with the associated transfer-indicating and hour-fraction characters to give each a value relatively to the morning and afternoon of the day, the "A" standing for "A. M." and the "P" standing for "P. M.," and these morning and afternoon designations are preferably placed at the top of a respective column.

As now included, the characters representing the names of the days of a week and the hour-designating characters are arranged on the center portion of the ticket and read from left to right, while the characters designating fractions of the hours are disposed transversely thereto in vertical columns on the lower margin of the ticket, and the means indicating transfer-points are placed parallel with these vertical columns, so that they read from the lower edge of the ticket. This arrangement of the characters is an important feature, as it brings the transfer-indicating characters and the hour-fraction characters together close to the edge of the ticket, where they are readily accessible for punching and can be instantly noted by the conductor, and, furthermore, can be thus placed on a short ticket in great multiplicity, as desirable when numerous transfer-points are to be considered, while placing thereabove of the hour-designating characters and the day-of-the-week characters in horizontal lines allows all punching to be done from one edge of the ticket, and thereby avoids swinging same and greatly facilitates the issue thereof.

By the arrangement of characters as herein set forth the work of issue of a time-limit ticket is reduced to a minimum, as but two punch-marks or the like are necessary to fully cover the day of the week, the particular part of the day, the hour, the fraction of the hour, and the point of transfer.

To issue a ticket arranged for time-limit, as above, the number designating the hour of the day is first selected from the row following the name of the day on which the transfer is issued and is punched. Then the number indicating the desired fraction of the hour is selected from the series associated with the name indicating the desired point of transfer and a punch-mark made either on this number or in the said transfer-name at a point immediately opposite, according to whether it is "P. M." or "A. M." It of course will be understood that the conductor may punch the hour in several tickets simultaneously before entering the car, when each transfer called for can then be completed by a single action, thus greatly facilitating the issue of transfers, as desirable in crowded cars passing over short routes having numerous transfer-points.

By incorporating the names of the days of the week on such a ticket as the base of operation the issue thereof is greatly facilitated, as but a few characters are required to fully cover the period, and the number of characters designating hours of the day are consequently greatly reduced, and consequently the desired character for punching more readily selected, while the arrangement of each series of hour-fraction characters with a transfer-indicating character reduces to a minimum the action of making the ticket for "A. M." or "P. M.," fraction of the hour, and transfer-points.

From the foregoing the use of the ticket will be readily comprehended and the various modifications and changes which may be made without departing from the essence of the invention readily understood; but, stated briefly, the action of issuing such a ticket would be substantially as follows: The character designating the desired hour and which follows the character designating the name of the day of issue is first selected and punched. Then the character indicating the point of transfer is sighted, and the character designating the particular fraction of the hour is noted in the series of characters associated therewith and a punch-mark made either directly on this character or directly opposite in the said transfer-indicating character, according to whether it is "A. M." or "P. M," or if it is desired to indicate but the even hour the second punch-mark may be made at the letters "A" or "P."

Having thus described my invention, what I claim as new, and desire to secure by Letters Patent of the United States of America, is—

1. In a ticket of the nature indicated; a series of characters or figures designating fractional parts of an hour arranged in alinement, and a character or name indicating a transfer-point associated therewith and arranged parallel the line of figures.

2. In a ticket of the nature indicated having hour-designating characters, a series of characters or figures designating fractional parts of an hour arranged in a vertical column, a character or name indicating a transfer-point associated therewith and arranged parallel said column, and characters or letters arranged with said figures and name to give them a value relatively to the morning or afternoon of the day.

3. In a ticket of the nature indicated; a character or abbreviation denoting the name of the day of the week, figures or characters associated therewith and denoting the hour of the day, a character or name indicating a transfer-point, and a series of characters or figures designating fractional parts of an hour arranged in alinement parallel with said transfer-indicating character.

4. In a ticket of the nature indicated; characters or abbreviations denoting the names of days of the week arranged in a vertical column, figures or characters denoting the hours of the day arranged in a horizontal row in line with each of said day-of-the-week characters, series of characters or figures designating fractional parts of an hour arranged in a vertical column and a character or name indicating a transfer-point associated with each of said series and arranged parallel therewith, the said series being designated to denote the fractions of the hours of "A. M." and the said name also being designated to denote the hours of "P. M."

Signed at Seattle, Washington, this 12th day of June, 1902.

RICHARD WM. WOOD.

Witnesses:
WM. M. GOODMAN,
GEO. R. MONROE, Jr.